US012092294B1

(12) United States Patent
Liang

(10) Patent No.: US 12,092,294 B1
(45) Date of Patent: Sep. 17, 2024

(54) PROJECTION LAMP

(71) Applicant: MOON STAR TECHNOLOGY (SHENZHEN) CO., LTD, Shenzhen (CN)

(72) Inventor: Guiyuan Liang, Shenzhen (CN)

(73) Assignee: MOON STAR TECHNOLOGY (SHENZHEN) CO., LTD, Shenzhen (CN)

( * ) Notice: Subject to any disclaimer, the term of this patent is extended or adjusted under 35 U.S.C. 154(b) by 0 days.

(21) Appl. No.: 18/472,240

(22) Filed: Sep. 22, 2023

(30) Foreign Application Priority Data

Aug. 24, 2023 (CN) ......................... 202322289791.1

(51) Int. Cl.
*F21V 14/06* (2006.01)
*F21V 5/04* (2006.01)

(52) U.S. Cl.
CPC ................ *F21V 14/06* (2013.01); *F21V 5/04* (2013.01)

(58) Field of Classification Search
CPC . F21V 14/06; F21V 5/04; F21V 5/008; F21V 5/02; F21V 5/048; F21V 21/34; F21K 9/65; F21Y 2115/10
See application file for complete search history.

(56) References Cited

U.S. PATENT DOCUMENTS 10,859,221 B2 * 12/2020 Chien ...................... F21V 14/08
11,841,126 B2 * 12/2023 Huang ...................... F21V 7/04
2016/0069540 A1 * 3/2016 Kjeldsen ............... F21S 10/007 362/232
2021/0263301 A1 * 8/2021 Oshima ................ G03B 21/147

* cited by examiner

*Primary Examiner* — Peggy A Neils

(57) ABSTRACT

A projection lamp includes a mounting base, a light source assembly, an incident lens group, a patterned lens group, and a light exiting lens group. The light source assembly is connected to the mounting base, the incident lens group is connected to the mounting base and disposed corresponding to the light source assembly, the patterned lens group is detachably connected to the mounting base and disposed corresponding to the incident lens group, and the incident lens group is located at a first side of the patterned lens group. The light exiting lens group is connected to the mounting base and located at a second side of the patterned lens group opposite to the first side of the patterned lens group. The light emitted by the light source assembly is guided to the patterned lens group through the incident lens group and exits through the light exiting lens group.

7 Claims, 3 Drawing Sheets

PROJECTION LAMP

TECHNICAL FIELD

The present disclosure relates to a technical field of lamps, and in particular to a projection lamp.

BACKGROUND

Projection lamps are one kind of LED lamps and each is equipped with an optical projection module inside, which is configured to project patterns onto a projection surface, such as a wall and a ceiling. For example, simulated star cloud pattern, starry sky pattern, etc. are projected on the projection surface for creating an atmosphere. In the related art, one projection lamp is generally used for projecting one pattern, the projection lamps are relatively single in projection patterns and have limitation on usage scenarios.

SUMMARY

Embodiments of the present disclosure provides a projection lamp for expanding usage scenarios of the projection lamp.

The embodiments of the present disclosure provides a projection lamp, including a mounting base, a light source assembly, an incident lens group, a patterned lens group, and a light exiting lens group. The light source assembly is connected to the mounting base, the incident lens group is connected to the mounting base and disposed corresponding to the light source assembly, the patterned lens group is detachably connected to the mounting base and disposed corresponding to the incident lens group, and the incident lens group is located at a first side of the patterned lens group. The light exiting lens group is connected to the mounting base and located at a second side of the patterned lens group opposite to the first side of the patterned lens group. Light emitted by the light source assembly is guided to the patterned lens group through the incident lens group and exits through the light exiting lens group.

Furthermore, the patterned lens group includes a base body and a patterned lens detachably connected to the base body. The patterned lens includes patterns and is disposed between the incident lens group and the light exiting lens group.

Furthermore, the base body includes a base and a driving wheel rotatably connected to the base, the patterned lens is detachably connected to the driving wheel. The projection lamp further includes a driving component connected to the mounting base, the driving component is configured to drive the patterned lens to rotate with respect to the base through the driving wheel.

Furthermore, the patterned lens is engaged with the driving wheel.

Furthermore, an accommodating groove is defined on the base, a protruding ring is disposed at a bottom of the accommodating groove, the protruding ring includes a light-transmitting hole, and the driving wheel is sleeved on the protruding ring.

Furthermore, the driving wheel includes gear teeth, the gear teeth are circumferentially distributed. The driving component includes a driving motor and a gear linked with the driving motor, the driving motor is connected to the mounting base, the accommodating groove includes an opening, and the gear extends into the opening to engage with the driving wheel.

Furthermore, the driving motor and the gear are coaxial, and a rotation axis of the gear is parallel to a rotation axis of the driving wheel.

Furthermore, the light source assembly includes a light emitting module connected to the mounting base, and a spotlight cup disposed corresponding to the lighting emitting module. The light emitting module at least includes red beads, blue beads, and green beads, and the spotlight cup is disposed corresponding to the incident lens group.

Furthermore, the incident lens group includes a refracting prism connected to the mounting base, and a convex lens disposed corresponding to the refracting prism. The convex lens is located between the refracting prism and the patterned lens group.

Furthermore, a guiding groove is defined on the mounting base, and the light exiting lens group is slidably matched with the guiding groove, so that a distance between the light exiting lens group and the patterned lens group is adjusted.

The projection lamp of the present disclosure includes the mounting base, the light source assembly, the incident lens group, the patterned lens group, and the light exiting lens group. The light source assembly is connected to the mounting base, the incident lens group is connected to the mounting base and disposed corresponding to the light source assembly, the patterned lens group is detachably connected to the mounting base and disposed corresponding to the incident lens group, and the incident lens group is located at the first side of the patterned lens group. The light exiting lens group is connected to the mounting base and located at the second side of the patterned lens group opposite to the first side of the patterned lens group. The light emitted by the light source assembly is guided to the patterned lens group through the incident lens group and exits through the light exiting lens group. Since the patterned lens group is detachably disposed on the mounting base, users may equip the projection lamp with a plurality of different patterned lens groups, and different optical images are projected to obtain more various pattern effects, thereby expanding the usage scenarios of the projection lamp.

BRIEF DESCRIPTION OF DRAWINGS

In order to more clearly illustrate embodiments of the present disclosure or technical solutions in the prior art, drawings that need to be used in the embodiments or the prior art are briefly described below, and it is obvious that the accompanying drawings in the following description are merely some embodiments of the present disclosure, and those who skilled in the art may obtain other drawings according to these drawings without involving any inventive effort.

Figure 1:
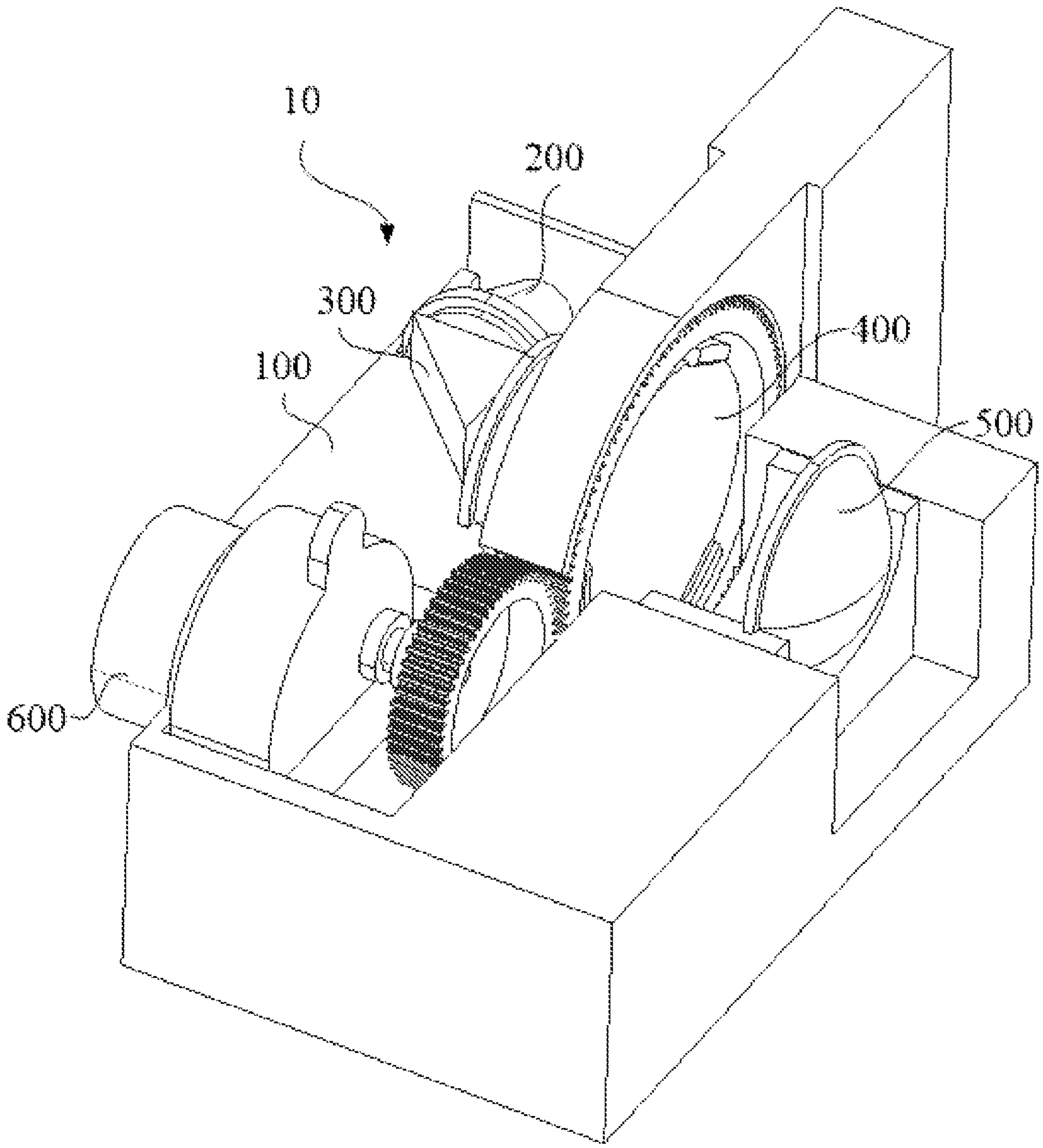
FIG. 1 is a schematic diagram of a projection lamp according to one embodiment of the present disclosure.

Reference numerals in the drawings: 10. projection lamp; 100. mounting base; 100*a*. guiding groove; 200. light source assembly; 210. light emitting module; 220. spotlight cup; 300. incident lens group; 310 refracting prism; 320. convex lens; 400. patterned lens group; 410. base body; 411. base; 411*a*. accommodating groove; 411*b*. protruding ring; 411*c*. light-transmitting hole; 411*d*. opening; 413. driving wheel; 420. patterned lens; 421. light entry surface; 423. light exiting surface; 500. light exiting lens group; 600. driving component; 610. driving motor; 620. gear.

DETAILED DESCRIPTION

In order to facilitate understanding of the present disclosure, the present disclosure is described more fully hereinafter with reference to the accompanying drawings. Preferred embodiments of the present disclosure are given in the accompanying drawings. However, the present disclosure may be implemented in many different forms and is not limited to the embodiments described herein. On the contrary, a purpose of providing these embodiments is to make the understanding of the present disclosure more thorough and comprehensive.

It should be noted that when an element is referred to as being "fixed to" another element, it may be directly on another element or intervening elements may also be present. When an element is considered to be "connected to" another element, it may be directly connected to another element or intervening elements may also be present. Terms "vertical", "horizontal", "left", "right" etc. used herein are for illustrative purposes only.

Unless otherwise defined, all technical and scientific terms used herein have the same meaning as commonly understood by those who skilled in the art of the present disclosure. The terminology terms used in the specification of the present disclosure is for the purpose of describing particular embodiments only and is not intended to be limiting of the present disclosure. As used herein, terms "and/or" include any and all combinations of one or more of associated listed items.

Figure 2:
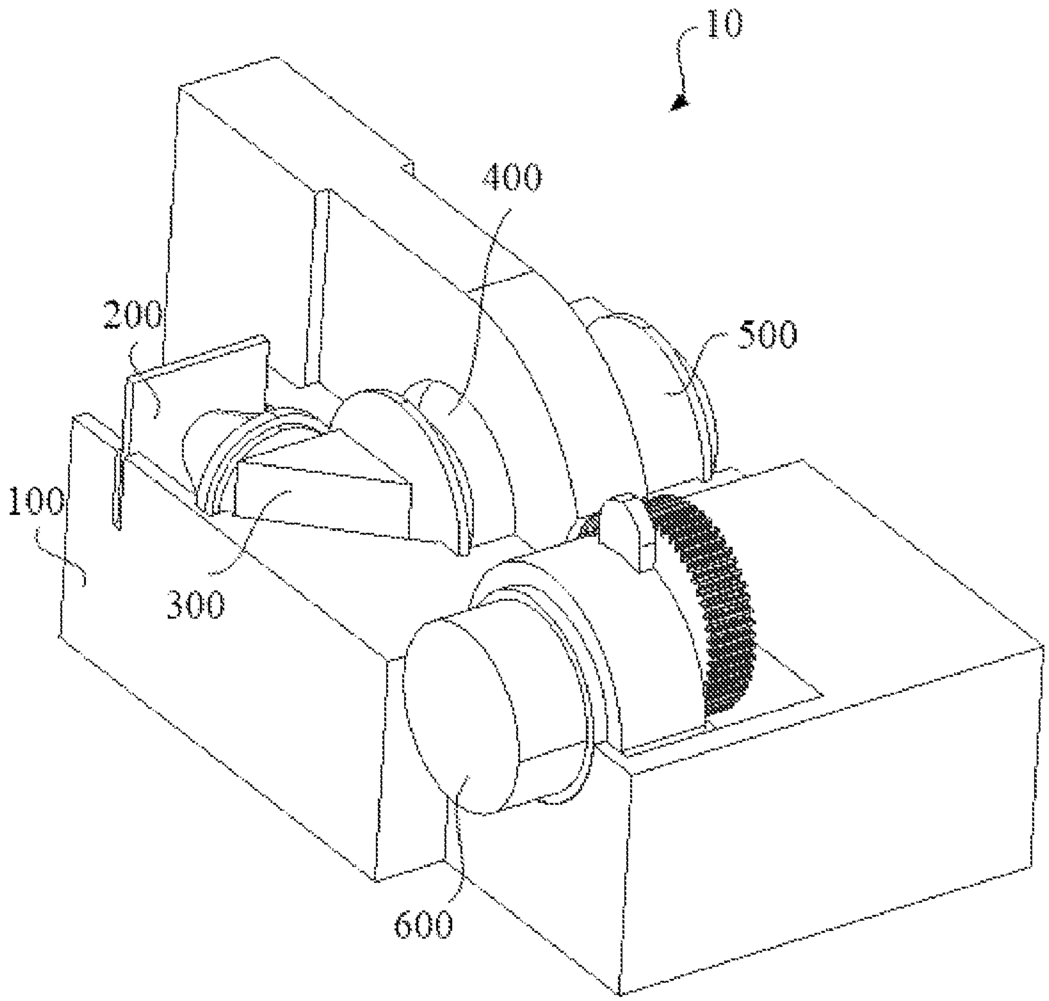
FIG. 2 is a schematic diagram of another view angle of the projection lamp shown in FIG. 1.

Referring to FIGS. 1 and 2, one embodiment of the present disclosure provides a projection lamp 10, including a mounting base 100, a light source assembly 200, an incident lens group 300, a patterned lens group 400, and a light exiting lens group 500. The light source assembly 200 is connected to the mounting base 100, the incident lens group 300 is connected to the mounting base 100 and disposed corresponding to the light source assembly 200, the patterned lens group 400 is detachably connected to the mounting base 100 and disposed corresponding to the incident lens group 300, and the incident lens group 300 is located at a first side of the patterned lens group 400. The light exiting lens group 500 is connected to the mounting base 100 and located at a second side of the patterned lens group 400 opposite to the first side of the patterned lens group 400. Light emitted by the light source assembly 200 is guided to the patterned lens group 400 through the incident lens group 300 and exits through the light exiting lens group 500.

Figure 3:
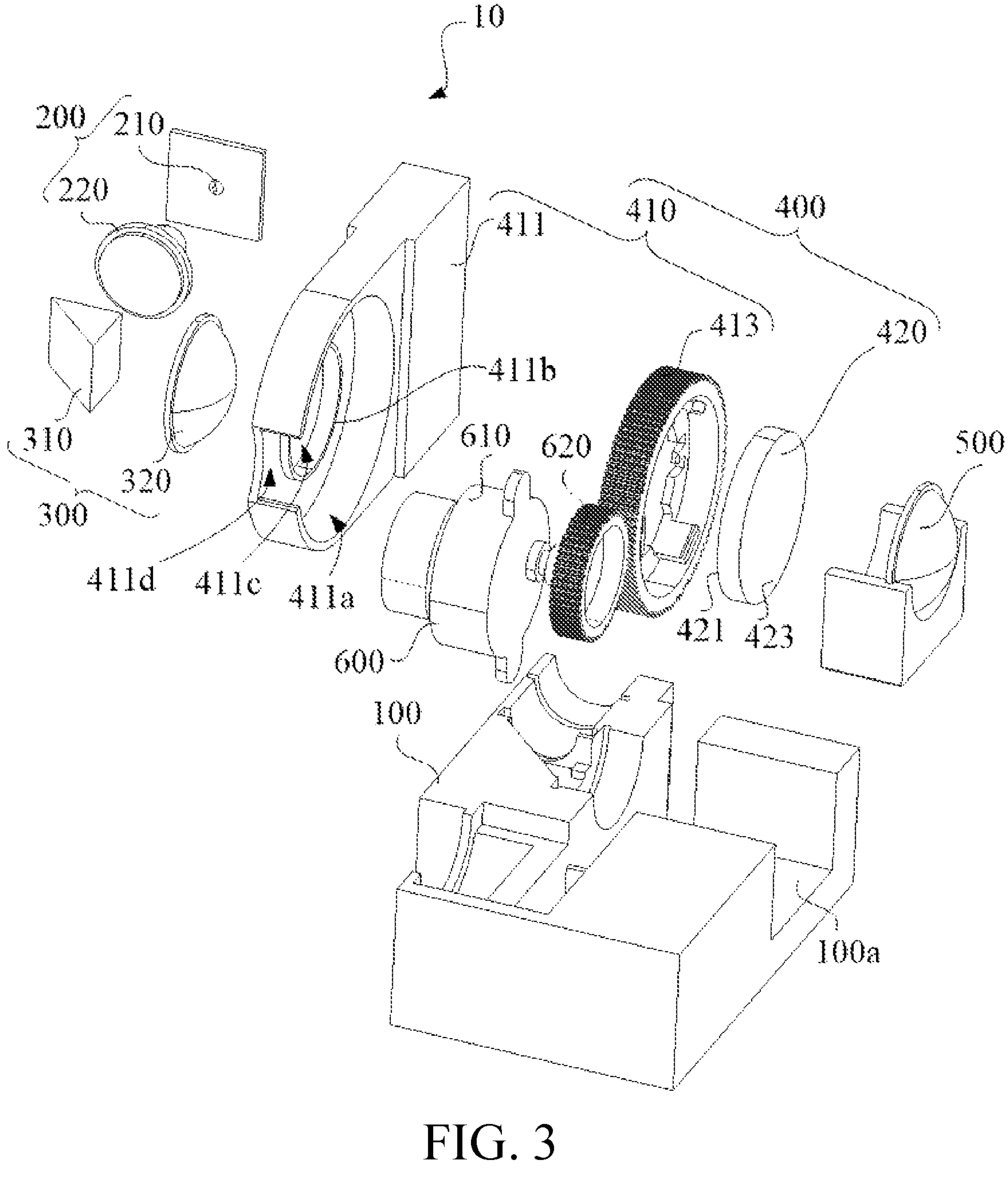
FIG. 3 is an exploded schematic diagram of the projection lamp shown in FIG. 1.

Further referring to FIG. 3, in some embodiments, the patterned lens group 400 includes a base body 410 and a patterned lens 420 detachably connected to the base body 410. The base body 410 is substantially block-shaped, the patterned lens 420 includes patterns and is disposed between the incident lens group 300 and the light exiting lens group 500. In some other embodiments, the patterned lens group 400 only includes the patterned lens 420, that is, the base body 410 is not needed.

The light source assembly 200 includes a light emitting module 210 connected to the mounting base 100, and a spotlight cup 220 disposed corresponding to the lighting emitting module 210. The light emitting module 210 at least includes red beads, blue beads, and green beads, and the spotlight cup 220 is disposed corresponding to the incident lens group 300. The red beads, the blue beads, and the green beads are LED beads, and each of the red beads, the blue beads, and the green beads is independently controlled, so that red light, green light, blue light, and light after mixing colors are emitted. Red, blue, and green are three primary colors for imaging and may be mixed to obtain white light and light having other colors, so as to obtain various lighting effects.

The spotlight cup 220 has a reflecting surface shaped in paraboloid, so that light emitted by the light emitting module 210 is converged to the incident lens group 300, a utilization rate of energy is improved, and brightness of projected light is ensured.

The incident lens group 300 includes a refracting prism 310 connected to the mounting base 100, and a convex lens 320 disposed corresponding to the refracting prism 310. The convex lens 320 is located between the refracting prism 310 and the patterned lens 420 of the patterned lens group 400. The refracting prism 310 is shaped in triangular prism, and refracts the light emitted by the light source assembly 200 to the incident lens group 300. In one embodiment of the present disclosure, a first surface of the convex lens 320 of the incident lens group 300 is planar, a second surface of the convex lens 320 of the incident lens group 300 is curved, the first surface of the convex lens 320 of the incident lens group 300 faces the refracting prism 310, and the second surface of the convex lens 320 of the incident lens group 300 faces the patterned lens 420, so that the light exiting from the refracting prism 310 is preliminarily diverged to the patterned lens 420, thereby fully projecting a pattern of the patterned lens 420 having a relatively large area. The light exiting lens group 500 may also be a convex lens, and in one embodiment of the present disclosure, a first surface of the convex lens of the light exiting lens group 500 is planar, a second surface of the convex lens of the light exiting lens group 500 is curved, and the first surface of the convex lens of the light exiting lens group 500 faces the patterned lens 420, thereby further diverging light exiting from the patterned lens 420 to project to an indoor space having a larger area.

In other embodiments, the refracting prism 310 may also be replaced by a reflecting prism, for example, the reflecting prism has a reflecting surface for fully reflecting the light emitted by the light source assembly 200 to the patterned lens 420.

Furthermore, the refracting prism 310 and the patterned lens 420 are spaced apart from the convex lens 320 of the incident lens group 300, the patterned lens 420 includes a light entry surface 421 and a light exiting surface 423 facing opposite to each other, the convex lens 320 of the incident lens group 300 and the light entry surface 421 are spaced apart, the light emitting lens group 500 and the light exiting surface 423 are spaced apart, and a distance between the light emitting lens group 500 and the light exiting surface 423 is greater than a distance between the convex lens 320 of the incident lens group 300 and the light entry surface 421. According to the structure as foregoing, the convex lens 320 of the incident lens group 300 and the convex lens of the light emitting lens group 500 may be the same in shape and size, and the convex lens 320 of the incident lens group 300 is configured to perform primary amplification on light spots from the light source assembly 200, and then perform secondary amplification after passing through the patterned lens 420, so that a customizable and personalized pattern is projected.

The base body 410 includes a base 411 and a driving wheel 413 rotatably connected to the base 411, the patterned lens 420 is detachably connected to the driving wheel 413.

For example, the patterned lens 420 is engaged with the driving wheel 413 to improve convenience of disassembly and assembly of the patterned lens 420. For another example, the patterned lens 420 is magnetically attracted to the driving wheel 413, which may also improve the convenience of disassembly and assembly of the patterned lens 420.

The base 411 is detachably disposed on the mounting base 100, thereby improving convenience of disassembly and assembly of the base body 410. For example, a positioning groove is defined on the mounting base 100, and the base 411 is engaged with the positioning groove, which is convenient for disassembling and assembling the base 411. Furthermore, an accommodating 411*a* is defined on the base 411, a protruding ring 411*b* is disposed at a bottom of the accommodating groove 411*a*, the protruding ring includes a light-transmitting hole 411*c*, and the driving wheel 413 is sleeved on the protruding ring 411*b* to rotatably connect the driving wheel 413 and the base 411. Such structure may further prevent thickness of the driving wheel 413 from being overlapped with the thickness of the base 411, so as to reduce the thickness of the base 410, thereby achieving a compact and miniaturized design of the projection lamp 10.

The projection lamp 10 further includes a driving component 600 connected to the mounting base 100, the driving component 600 is configured to drive the patterned lens 420 to rotate with respect to the base 411 through the driving wheel 413. In some embodiments, the driving wheel 413 includes gear teeth, the gear teeth are circumferentially distributed. The driving component 600 includes a driving motor 610 and a gear 620 linked with the driving motor 610, the driving motor 610 is connected to the mounting base 100, the accommodating groove 411*a* includes an opening 411*d*, and the gear 620 extends into the opening 411*d* to engage with the driving wheel 413. When the patterned lens 420 rotates, a projected pattern may also rotate, thereby obtaining a dynamic illumination effect and enriching usage scenarios. In some embodiments, a laser is further disposed on the base body 410 for projecting laser bright spots, simulating a starlight effect, and further expanding the usage scenarios.

Furthermore, in some embodiments, the driving motor 610 and the gear 620 are coaxial, and a rotation axis of the gear 620 is parallel to a rotation axis of the driving wheel 413. In another word, in the embodiments of the present disclosure, the driving motor 610 directly drives the driving wheel 413 through the gear 620, and there is no need to provide an intermediate transmission structure, such as a transmission wheel set. Such structure may reduce the number of associated components, reduce costs, and improve compactness of an inner structure of the projection lamp 10.

In some embodiments, a guiding groove 100*a* is defined on the mounting base 100, and the light exiting lens group 500 is slidably matched with the guiding groove 100*a*, so that a distance between the light exiting lens group 500 and the patterned lens group 400 is adjusted. For example, a rotatable dial wheel is disposed on the mounting base 100, the rotatable dial wheel has gear teeth, and the gear teeth are circumferentially distributed, the light exiting lens group 500 has a rack extending along a length direction of the guiding groove 100*a*, and the rotatable dial wheel is engaged with the rack for transmission. In a using process, users may rotate the rotatable dial wheel to drive the light exiting lens group 500 to slide in the guide groove 100*a*, thereby adjusting the distance between the light exiting lens group 500 and the patterned lens group 400, adjusting a focal length, and projecting a clear image.

Technical features of the above embodiments may be arbitrarily combined, so that the description is concise, and possible combinations of the technical features in the foregoing embodiments are not all described; however, as long as there is no contradiction in the combinations of these technical features, the possible combinations of the technical features in the foregoing embodiments should all be considered to be within the scope of the present specification.

The above embodiments only express several embodiments of the present disclosure, and the description thereof is more specific and detailed, but cannot be understood as a limitation on scopes of the present disclosure. It should be noted that, for those who skilled in the art, several variations and improvements may be made without departing from the concept of the present disclosure, and these are all within the scopes of the present disclosure. Therefore, the scope of the present disclosure shall be subject to appended claims.

What is claimed is:

1. A projection lamp, comprising:

a mounting base;

a light source assembly, connected to the mounting base;

an incident lens group, connected to the mounting base and disposed corresponding to the light source assembly;

a patterned lens group, detachably connected to the mounting base and disposed corresponding to the incident lens group, and the incident lens group located at a first side of the patterned lens group; and a light exiting lens group, connected to the mounting base and located at a second side of the patterned lens group opposite to the first side of the patterned lens group;

wherein light emitted by the light source assembly is guided to the patterned lens group through the incident lens group and exits through the light exiting lens group wherein the patterned lens group comprises a base body and a patterned lens detachably connected to the base body; the patterned lens comprises patterns and is disposed between the incident lens group and the light exiting lens group;

the base body comprises a base and a driving wheel rotatably connected to the base, the patterned lens is detachably connected to the driving wheel; the projection lamp further comprises a driving component connected to the mounting base, the driving component is configured to drive the patterned lens to rotate with respect to the base through the driving wheel;

wherein an accommodating groove is defined on the base, a protruding ring is disposed at a bottom of the accommodating groove, the protruding ring comprises a light-transmitting hole, and the driving wheel is sleeved on the protruding ring.

2. The projection lamp according to claim 1, wherein the patterned lens is engaged with the driving wheel.

3. The projection lamp according to claim 1, wherein the driving wheel comprises gear teeth, the gear teeth are circumferentially distributed; the driving component comprises a driving motor and a gear linked with the driving motor, the driving motor is connected to the mounting base, the accommodating groove comprises an opening, and the gear extends into the opening to engage with the driving wheel.

4. The projection lamp according to claim 3, wherein the driving motor and the gear are coaxial, and a rotation axis of the gear is parallel to a rotation axis of the driving wheel.

5. The projection lamp according to claim 1, wherein the light source assembly comprises a light emitting module connected to the mounting base, and a spotlight cup disposed corresponding to the lighting emitting module; the light emitting module at least includes red beads, blue beads, and green beads, and the spotlight cup is disposed corresponding to the incident lens group.

6. The projection lamp according to claim 5, wherein the incident lens group comprises a refracting prism connected to the mounting base, and a convex lens disposed corresponding to the refracting prism; the convex lens is located between the refracting prism and the patterned lens group.

7. The projection lamp according to claim 1, wherein a guiding groove is defined on the mounting base, and the light exiting lens group is slidably matched with the guiding groove, so that a distance between the light exiting lens group and the patterned lens group is adjusted.

* * * * *